United States Patent [19]
Stevens

[11] 4,295,916
[45] Oct. 20, 1981

[54] TAPE BRAKE FOR TAPE WRAPPER

[75] Inventor: Samuel B. Stevens, Pekin, Ill.

[73] Assignee: Caterpillar Tractor Co., Peoria, Ill.

[21] Appl. No.: 133,634

[22] Filed: Sep. 11, 1979

[51] Int. Cl.³ .......................................... B29H 17/00
[52] U.S. Cl. .................................. 156/397; 156/117;
156/130; 156/410; 156/413; 156/421; 156/494;
156/495; 156/510
[58] Field of Search ............... 156/117, 130, 184, 187,
156/195, 250, 397, 405 P, 410, 411, 413, 421,
494, 495, 510; 242/75.4, 156.1; 225/3, 100, 101,
106

[56] References Cited
U.S. PATENT DOCUMENTS

| 3,251,722 | 5/1966 | Holman | 156/130 |
| 3,717,529 | 2/1973 | Rattray et al. | 156/130 |
| 3,954,538 | 5/1976 | Grawey | 156/117 |
| 4,069,088 | 1/1978 | Cottam | 156/392 |
| 4,105,488 | 8/1978 | Hayes et al. | 156/405 |

Primary Examiner—Caleb Weston
Attorney, Agent, or Firm—Wegner, Stellman, McCord, Wiles & Wood

[57] ABSTRACT

A tape-applying apparatus (10) is advanced toward a body (15) upon which a strip of tape (16) is to be applied to urge a plurality of stitching rollers (72,74) against the body (15). Further advancing of the apparatus (10) will move an applicator roller (42) and the end of the tape (16) into engagement with the body (15). As the body (15) is moved past the tape-applying apparatus (10), the tape (16) is pulled over the applicator roller (42) and is stitched to the body (15) by the stitching rollers (72,74). When sufficient tape (16) has been applied, the housing (20) of the tape-applying apparatus (10) is urged away from the body (15) which moves the applicator roller (42) out of contact with the body (15). A brake apparatus (94) on the housing (20) is activated by a cam recess (80) on the holders (50) for some of the stitching rollers (72). The brake apparatus (94) engages the applicator roller (42) to arrest further feeding of tape (16) to the body (15). Continued rotation of the body (15) with some of the stitching rollers (72) in contact therewith will stretch the tape (16) between the applicator roller (42) and the stitching rollers (72) until the tape (16) is severed. The free end of the tape (16) is left in position on the applicator roller (42) ready for the next application to the same or a different body (15).

11 Claims, 7 Drawing Figures

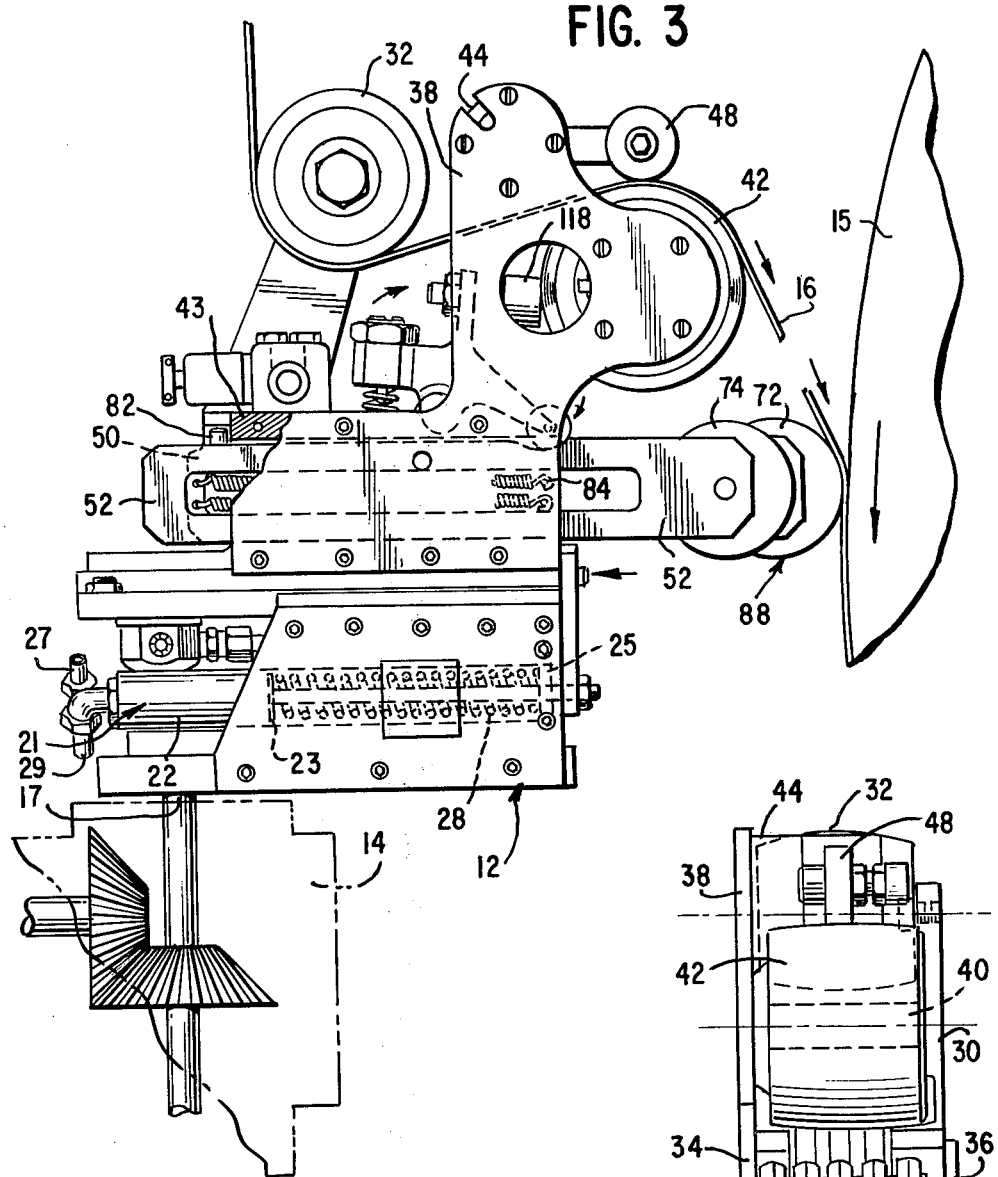
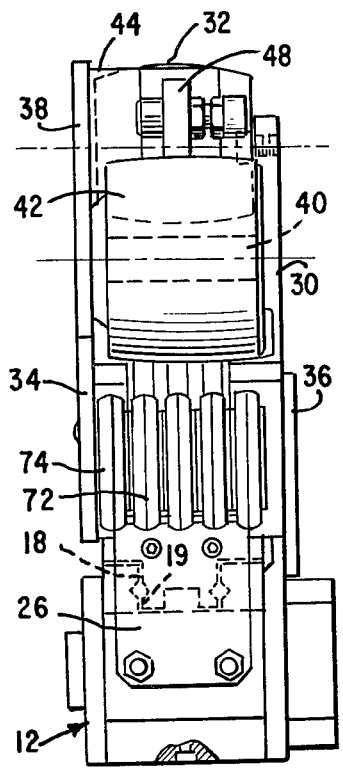
FIG. 3
FIG. 4

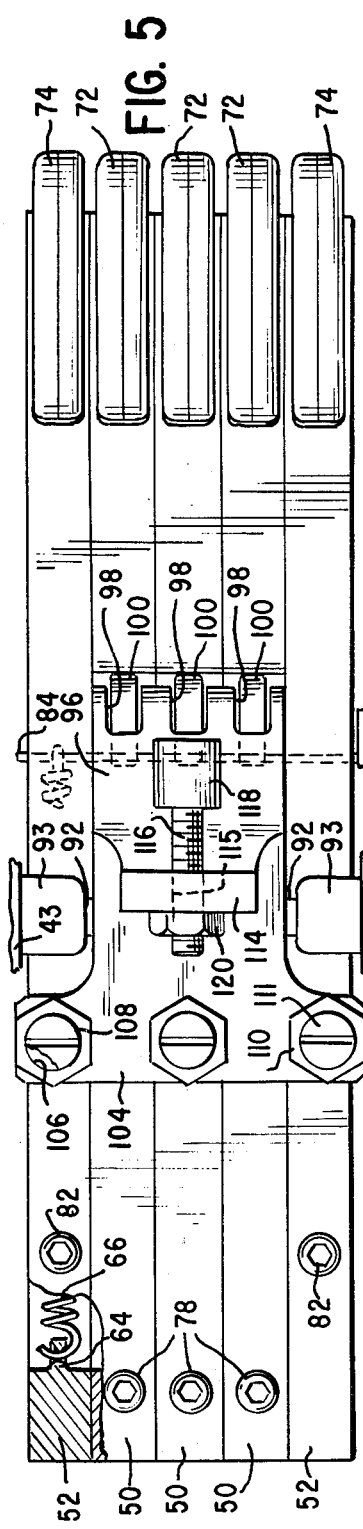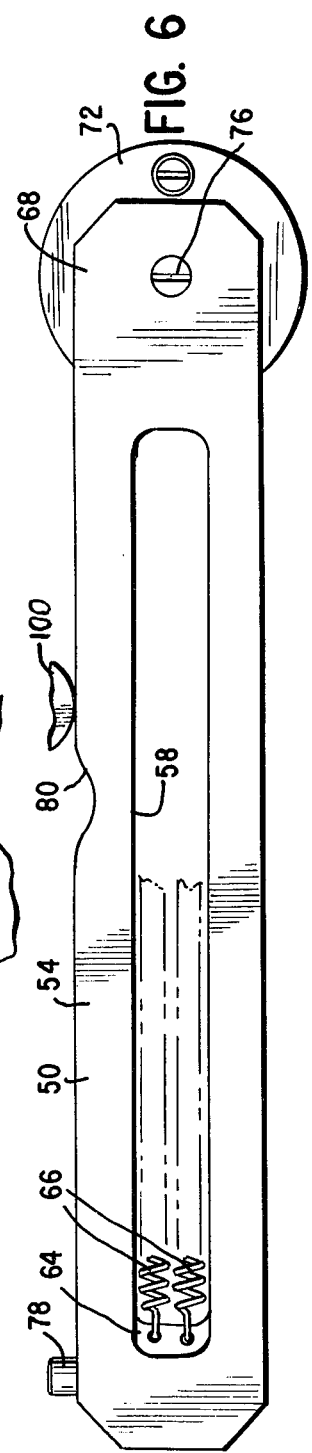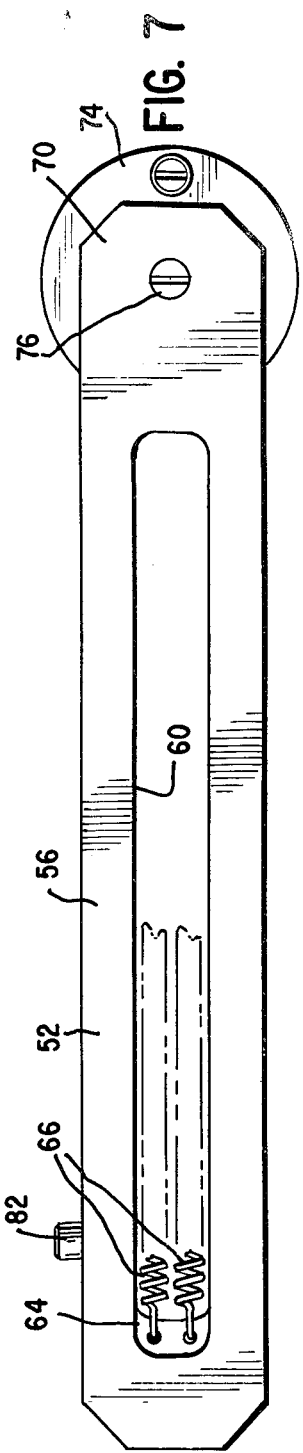

TAPE BRAKE FOR TAPE WRAPPER

DESCRIPTION

1. Technical Field

This invention relates to apparatus for applying a tape to a body and, more particularly, to an apparatus for automatically tacking, applying, stitching and then severing the tape in a particular manner.

2. Background Art

In the manufacture of tape-wound toroidal bodies, such as tires and the like, a large amount of manual labor is still required particularly in starting and stopping the application of each layer of tape on the body. One such problem prevails in the application of a tape of rubber to a toroidal carcass wherein the tape is initially hand held to the carcass until the applicator and stitching head takes over to apply the desired amount of material. At the conclusion of the application of the tape, the equipment is shut down and the tape is manually severed and the free end tacked to the carcass.

One device shown in U.S. Pat. No. 3,717,529, which issued to W. L. Rattray et al on Feb. 20, 1973, discloses an apparatus for automatically advancing an applicator head for applying an end of a tape to the carcass after which the carcass is rotated to start to wrap the tape on the carcass. The applicator head is retracted from the carcass and guides the tape to stitching rollers for applying and stitching the tape to the carcass. A brake is actuated by a signal to stop rotation of the applicator head whereupon the continued rotation of the carcass under the stitching rollers stretches the tape between the stitching rollers and the applicator head until it breaks. The free end of the tape connected to the source of the tape drapes over the applicator head ready for the next application of tape to the same carcass or to a different carcass.

Applying the tape to the carcass using only the stitching rollers may not produce a one-hundred percent bubble free or fully stitched tape onto the carcass. Applying the brake to the applicator head relies on a signal which may or may not be triggered in a timely fashion so that the tape is severed in a less than optimum location which may necessitate hand work to correct.

DISCLOSURE OF INVENTION

The present invention is directed to overcoming one or more of the problems as set forth above.

In one aspect of the present invention, a tape-applying apparatus is provided with an applicator head which automatically tacks a free end of a tape to a body which is then rotated past the engaged applicator head and a stitcher assembly to continually stitch a predetermined layer or layers of tape to the body. The applicator head and the stitcher assembly remain in contact with the body. At the conclusion of the application, the apparatus retracts from the body so as to separate the applicator head from the body with at least a portion of the stitcher assembly still in stitching contact with the body. A brake is provided which is activated by the relative movement between the applicator head and the stitcher assembly, whereby the brake engages the applicator head to stop rotation of the applicator head. The length of tape between the applicator head and the stitcher head is stretched until it breaks with the free end of the tape, that is connected to the source of the tape, draping over the applicator head ready for the next application of tape to the same or to a different body.

BRIEF DESCRIPTION OF DRAWINGS

FIG. 3 is an elevational view similar to FIG. 1 only with the applicator head retracted and the stitcher assembly partially retracted so that the tape is just breaking;

FIG. 4 is a view taken along the line 4—4 of FIG. 1;

FIG. 5 is an enlarged view taken along the line 5—5 of FIG. 2;

FIG. 6 is an enlarged elevational view of one holder of the stitcher assembly; and FIG. 7 is an enlarged elevational view of a second holder of the stitcher assembly.

BEST MODE FOR CARRYING OUT THE INVENTION

Figures 1, 2:
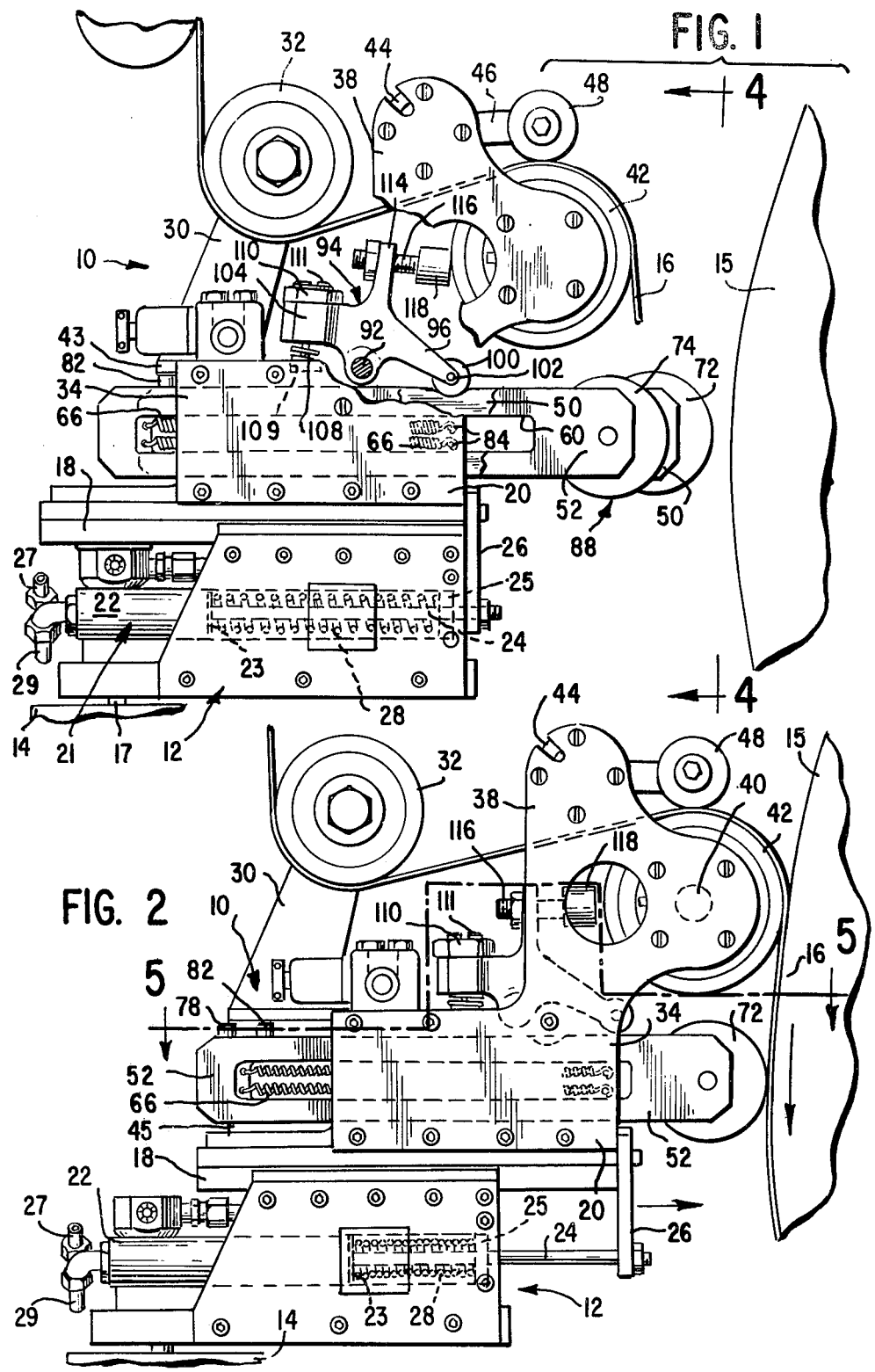
FIG. 1 is an elevational view of a tape-applying apparatus including an applicator head and stitcher assembly with the improved brake-applying apparatus for the applicator head.
FIG. 2 is an elevational view similar to FIG. 1 only with the applicator head and stitcher assembly in operative tape-applying contact with a body.

Referring to FIG. 1 of the drawings, a tape-applying apparatus 10 is shown slidably mounted on a cross slide assembly 12 which is pivotally mounted on the end of a support arm 14. The support arm 14 is manipulated to position the cross slide assembly 12 and the tape-applying apparatus 10 in close proximity to a body 15 to which the tape 16 is to be applied. Since the structure and operation of the support arm 14, the pivot 17, and the cross slide assembly 12 relative to the body 15 are well known in the art, no detailed description thereof will be made in this disclosure. Suffice it to say, the support arm 14 locates and orients the cross slide assembly 12 and the tape-applying apparatus 10 at an appropriate location relative to the body 15 and moves back and forth across the tread area and the side walls of the body 15 during the application of the tape 16 so as to apply a layer or layers of tape 16 to the body 15 in a predetermined manner.

The cross slide assembly 12 and the housing 20 of the tape-applying apparatus 10 have interfitting guides 18, FIG. 4, carried by the housing 20 and tracks 19 in the top wall of the cross slide assembly 12 which slidably coact to permit the housing 20 to move back and forth relative to the cross slide assembly 12. A typical guide and track assembly is marketed by The Bendix Corporation as a Schneeberger NK3-105 top (guide 18) and NK3-180 base (track 19). A fluid actuator 21 is mounted on the cross slide assembly 12 and includes a cylinder 22 in which is slidably mounted a reciprocating piston 23. An actuator rod 24 is connected to the piston 23 and extends from a cylinder 22 along an axis substantially parallel to the axis of the guides 18 and tracks 19. The actuator rod 24 is connected to a plate 26 which is secured, as by bolts, to the lower front of the housing 20 so that admitting fluid to the cylinder 22 through inlet 27 will move the piston 23 and extend the actuator rod 24 to move the tape-applying apparatus 10 along the tracks 19 on the cross slide assembly 12. A spring 28 is positioned in the cylinder 22 and encircles the rod 24. The spring 28 bears against the piston 23 and against the end wall 25 of the cylinder 22 so that exhausting the cylinder 22 through outlet 29 will permit the spring 28 to move the actuator rod 24 and the tape-applying apparatus 10 away from the body 15.

A bracket 30, as can be seen in FIGS. 1 and 4, is secured to and extends up from the one side of the cross slide assembly 12 to support a transposition roller 32 above the tape-applying apparatus 10. The transposition roller 32, being mounted on the cross slide assembly 12, will move with the cross slide assembly 12 to guide the tape as it is received from a source of supply, not shown. The tape 16 will exit the roller 32 along an established path as it is directed toward the body 15 no matter how the tape-applying apparatus 10 and the cross slide assembly 12 are oriented with respect to the support arm 14. As an example, assuming that the tape 16 is a strip of rubber to be applied to a tire body or carcass, the strip will be supplied from an extruder, not shown, and will exit roller 32 in an established path.

The tape-applying apparatus 10 has the housing 20 comprised of a pair of spaced apart side plates 34 and 36 secured thereto with plate 34 having an upwardly extending arm 38 for supporting, in a cantilever fashion, an axle 40 about which an applicator roller 42 is rotatably mounted. A thickness transducer 44 is mounted on the arm 38 and has an arm 46 extending from the transducer 44 and supporting a feeler roller 48 in contact with the applicator roller 42 or in contact with the tape 16 passing between the applicator roller 42 and the feeler roller 48. The thickness transducer 44 is connected to a programmed control to sense when the tape 16 is too thick or too thin whereupon the controls will signal the source of the tape, such as the extruder or the like, to automatically decrease or increase the thickness of the tape 16 until it is within the tolerable limits.

Slidably mounted between the side plates 34, 36 and between a top plate 43 and a bottom plate 45 of the housing 20 of the tape-applying apparatus 10 is a plurality of slide holders 50 and 52, which slide holders are shown in detail in FIGS. 5, 6 and 7. In the present embodiment, three holders 50 are juxtaposed with respect to each other and are positioned between two spaced apart holders 52. The slide holders 50 and 52 are comprised of an elongate body portion 54 and 56, respectively, with elongate slots 58 and 60 cut throughout substantially the length of said body portions 54 and 56. At one end of each slot 58 and 60, a retaining web 64 is provided which has two vertically spaced openings for receiving one end of a pair of springs 66. The springs 66 are nested in the slots 58 and 60 and have their opposite ends anchored to a pair of pins 64 extending from one side plate 34 to the other side plate 36. The pins 84 extend through the elongate slots 58,60 in the holders 50,52, respectively. The forward or extended end portions 68 and 70 of the holders 50 and 52, respectively, are bifurcated, as viewed in FIG. 5, and receive stitching rollers 72 and 74 pivotally mounted about pivot pins 76 passing between the arms of the bifurcated portions 68 and 70. Each slide holder 50 has an upwardly extending stop lug 78 on the upper edge of the body portion 54 and positioned close to the one extremity of the holder, said extremity being spaced from the end of the holder supporting the roller 72. Each holder 50 also has a camming recess 80 formed in the upper edge of the body portion 54 thereof, said camming recesses 80 being transversely aligned with each other when the rollers 72 are transversely aligned. Each holder 52 has an upwardly extending stop lug 82 on the upper edge of the body portion 56 and positioned inboard a distance in excess of the spacing of the stop lug 78 from the end of holder 50.

As can be seen in FIG. 5, holders 52 comprise the two outboard holders and holders 50 comprise the three inboard holders. When the extremities of the five holders 52,50,50,50,52 are aligned, the stop lugs 78 on the holders 50 are spaced longitudinally from the stop lugs 82 on the holders 52. The springs 66, between the holders 50,52 and the housing 20, are all loaded so as to urge the holders 50 and 52 outward or to the right of the housing 20, as viewed in FIGS. 1 through 3. In FIG. 1, the springs 66 have urged the holders 50 and 52 to the right so that all five stop lugs 78 and 82 are in alignment with each other and engage the edge of the top plate 43 of the housing 20, the contact with the top plate 43 being shown in FIG. 3. The five holders 50 and 52, with the rollers 72 and 74 from the stitcher assembly 88 for the tape-applying apparatus 10.

A brake assembly 94 is pivotally mounted about a pivot 92 extending between brackets 93 on the top plate 43 of the housing 20. The brake assembly 94 is comprised of a forwardly extending plate 96 which has three cutouts 98 in the forward edge thereof, FIG. 5, in which cutouts 98 are rotatably mounted three cam rollers 100. The cam rollers 100 are retained in the cutouts 98 by means of a pin 102. The brake assembly 94 has an arm portion 104 extending from the pivot 92 in a direction opposite to the direction of plate 96. The arm portion 104 has three threaded openings 106, in each one of which is positioned a spring 108. The lower ends of the springs 108 nest in three sockets 109 formed in the top plate 43 of the housing 20. A lock nut 110 is threaded on a threaded pilot member 111, which pilot member 111 is threaded in opening 106 and bears on the springs 108 for adjusting the loading on the springs 108. Extending upwardly from the pivot 92 at the junction between the plate 96 and the arm portion 104 is a tang 114 which has a member 116 threaded through a threaded opening 115 therein. A resilient braking member or block 118 is mounted on an extended end of said member 116. A lock nut 120 is threaded on the member 116 and bears against the tang 114 for locking the forward surface of the braking member or block 118 in position relative to the brake assembly 94. The springs 108 urge the brake assembly 94 in a clockwise direction around the pivot 92 to urge the cam rollers 100 into contact with the top surfaces of the three holders 50. As the holders 50 are moved in the housing 20, the cam rollers 100 will roll on the top edges of the holders 50 and will drop into the cam recesses 80 when the holders 50 are fully extended relative to the housing 20. When the cam rollers 100 drop into the cam recesses 80, the brake assembly 94 is pivoted clockwise by the springs 108 which will urge the braking member or block 118 against the applicator roller 42 to stop rotation of said applicator roller. All three cam rollers 100 must drop into all three cam recesses 80 in order for the brake to be applied. This will prevent false braking caused by one or two slide holders becoming extended as when the tape 16 is being applied around a corner or around a shoulder, such as between the tread and a side wall of a tire.

INDUSTRIAL APPLICABILITY

Referring to FIG. 1, a tape 16 is fed around the transposition roller 32 and threaded between the feeler roller 48 and the applicator roller 42 with the end of the tape 16 hanging freely from the applicator roller 42. Since the tape-applying apparatus 10 is in the retracted position relative to the cross slide assembly 12, the holders 50 and 52 are in the fully forward position with the stop lugs 78 and 82 bearing against the end of the top plate 43 and the stitching rollers 72 and 74 are spaced from the body 15. The cam rollers 100 are seated in the cam recesses 80 and the brake assembly 94 is pivoted clockwise with the braking member or block 118 bearing against the applicator roller 42 to prevent rotation of the applicator roller 42. To apply tape 16 to the body 15, the fluid actuator 21 on the cross slide assembly 12 is activated to move the actuator rod 24 and tape-applying apparatus 10 forward to contact the stitching rollers 72 and 74 with the body 15. As the actuator rod 24 is moved outward of the cylinder 22, the spring 28 is compressed between piston 23 and end wall 25. Once the stitching rollers 72,74 contact the body 15, the slide holders 50 and 52 will remain stationary with respect to the body 15 as the housing 20 continues to move toward the body 15 which will roll the cam rollers 100 out of the cam recesses 80 to pivot the brake assembly 94 in a counterclockwise direction and release the braking member or block 118 from the surface of the applicator roller 42. The ends of the springs 66, pinned by pins 84 to the housing 20, will move relative to the holders 50,52 to stretch the springs 66 to spring load the stitching rollers 72,74 against the body 15. Continued movement of the housing 20 toward the body 15 will engage the free end of the tape 16 and the applicator roller 42 against the body 15, to tack the tape 16 to the body 15. Rotation of the body 15 in a counterclockwise direction will pull the tape 16 from the applicator roller 42 to between the stitching rollers 72 and 74 and the body 15. The stitching rollers 72,74 will stitch the tape 16 to the body 15. The applicator roller 42 will remain in contact with the body 15 to feed the tape 16 to the body 15, which tape 16 is then tacked and stitched by the stitching rollers 72 and 74.

When the desired thickness of the layer of tape has been added to the body 15, a command signal from the controls will exhaust the fluid from cylinder 22 through exhaust outlet 29, whereupon the spring 28 will drive the piston 23, rod 24 and housing 20 of the tape-applying apparatus 10 away from the body 15 to separate the applicator roller 42 from the body 15. When the housing 20 has retracted from the body 15 a predetermined amount, the cam rollers 100 will drop into the cam recesses 80 in the holders 50 whereupon the springs 108 will pivot the brake assembly 94 in a clockwise direction to apply the braking member or block 118 against the applicator roller 42 to stop further rotation of the applicator roller 42. Since the stitching rollers 72 on the holders 50 are still in contact with the body 15, they will continue to stitch the tape 16 to the continually rotating body 15, but, since the applicator roller 42 is not rotating, no material is being fed from the applicator roller 42, so that the tape 16 will be stretched and will be severed between the stitching rollers 72 and the applicator roller 42. The one free end of the tape 16 will remain draped over the applicator head ready for the next application and the other free end of the tape 16 will be stitched to the body 15 by the stitching rollers 72. The controls will command retraction of the tape-applying apparatus 10 from the body 15 by the support arm 14 which will move the tape-applying apparatus 10 to the condition of FIG. 1, wherein the apparatus is again ready to be moved forward into contact with the same or a different body for application of another layer of tape thereto.

In one modified form of the invention, when the layer of tape 16 has been built up to a desired thickness, all drives are stopped. The controls will then command outlet 29 to exhaust the fluid from the cylinder 22 so that the spring 28 will retract the housing 20 and applicator roller 42 from contact with the body 15. The springs 66 will retain the stitching rollers 72,74 in contact with the body 15. At a predetermined point, the cam rollers 100 will engage in cam recesses 80 to apply the braking member or block 118 to the applicator roller 42 to prevent further rotation of the applicator roller 42. The controls will command a small amount of rotation to the body 15 which will stretch the tape 16 between the stitching rollers 72 and the applicator roller 42 until the tape 16 severs therebetween with the one free end of the tape 16 draping over the applicator roller 42 ready for the next application to a body 15 and with the other free end of the tape 16 being stitched to the rotating body 15 by the stitching rollers 72.

Other aspects, objects and advantages of this invention can be obtained from a study of the drawings, the disclosure and the appended claims.

I claim:

1. In an apparatus (10) for severing a tape (16) being applied to a body (15) as said body (15) is moved past said apparatus (10), a housing (20), an applicator roller (42) carried by said housing (20) for applying tape (16) to said body (15), a holder (50) movably carried on said housing (20), a stitching roller (72) rotatably mounted on said holder (50) and projecting outward from said housing (20) to a predetermined position relative to said applicator roller (42), resilient means (66) urging said holder (50) and said stitching roller (72) outward from said housing (20) to position said stitching roller (72) outboard of said applicator roller (42), in combination: brake means (94) carried by said housing (20) for arresting rotation of said applicator roller (42), and means (80) on said holder (50) for activating said brake means (94) in response to said holder (50) and stitching roller (72) being extended a predetermined amount outboard of said applicator roller (42) whereby the tape (16) extending from said applicator roller (42) to said stitching roller (72) is severed as said body (15) is moved past said stitching roller (72).

2. In an apparatus (10) as claimed in claim 1 wherein fluid actuator means (22) is provided for moving said housing (20) toward said body (15) to engage said applicator roller (42) and said stitching roller (72) with said body (15), whereby said tape (16) is applied directly to said body (15) by said applicator roller (42) and is stitched to said body (15) by said stitching roller (72).

3. In an apparatus (10) as claimed in claim 2 wherein resilient means (28) are provided for moving said housing (20) and said applicator roller (42) away from said body (15) upon exhausting said fluid actuator means (22).

4. In an apparatus (10) as claimed in claim 1 wherein three holders (50) are slidably disposed side-by-side in said housing (20), and having a stitching roller (72) rotatably mounted on the projecting end of each holder (50) in said predetermined position relative to said applicator roller (42).

5. In an apparatus (10) as claimed in claim 4 wherein stop means (78) are provided on each holder (50) to limit the extent of outward movement of said holders (50).

6. In an apparatus (10) for severing a tape (16) being applied to a body (15) as said body (15) is moved past said apparatus (10), a housing (20), an applicator roller (42) carried by said housing (20) for applying tape (16) to said body (15), a holder (50) movably carried on said housing (20), a stitching roller (72) rotatably mounted on said holder (50) and projecting outward from said housing (20) to a predetermined position relative to said applicator roller (42), resilient means (66) urging said holder (50) and said stitching roller (72) outward from said housing (20) to position said stitching roller (72) outboard of said applicator roller (42), in combination: brake means (94) carried by said housing (20) for arresting rotation of said applicator roller (42), and means (80) on said holder (50) for activating said brake means (94) when said holder (50) and stitching roller (72) is extended a predetermined amount outboard of said applicator roller (42) whereby the tape (16) extending from said applicator roller (42) to said stitching roller (72) is severed as said body (15) is moved past said stitching roller (72), said brake means (94) including a braking block (118) pivotally mounted on said housing (20), and spring means (108) urging said braking block (118) against said applicator roller (42) to arrest rotation of said applicator roller (42).

7. In an apparatus (10) as claimed in claim 6 wherein said means (80) on said holder (50) for activating said brake means (94) is a cam recess (80) in one surface of said holder (50) and wherein said brake means (94) operatively contacts said cam recess (80) to pivot said brake means (94) to apply braking force to said applicator roller (42).

8. In an apparatus (10) as claimed in claim 6 wherein said means (80) on said holder (50) for activating said brake means (94) is a cam recess (80) on said holder (50) and wherein said brake means (94) has a cam roller (100), said spring means (108) urging said cam roller (100) into said cam recess (80) when said holder (50) and said housing (20) are in a predetermined relative position.

9. In an apparatus (10) for severing a tape (16) being applied to a body (15) as said body (15) is moved past said apparatus (10), a housing (20), an applicator roller (42) carried by said housing (20) for applying tape (16) to said body (15), a holder (50) movably carried on said housing (20), a stitching roller (72) rotatably mounted on said holder (50) and projecting outward from said housing (20) to a predetermined position relative to said applicator roller (42), resilient means (66) urging said holder (50) and said stitching roller (72) outward from said housing (20) to position said stitching roller (72) outboard of said applicator roller (42), in combination: brake means (94) carried by said housing (20) for arresting rotation of said applicator roller (42), and means (80) on said holder (50) for activating said brake means (94) when said holder (50) and stitching roller (72) is extended a predetermined amount outboard of said applicator roller (42) whereby the tape (16) extending from said applicator roller (42) to said stitching roller (72) is severed as said body (15) is moved past said stitching roller (72), said means (80) on said holder (50) being a cam recess (80) in one surface of said holder (50), said brake means (94) operatively contacting said cam recess (80) to pivot said brake means (94) to apply braking force to said applicator roller (42).

10. A tape-applying apparatus (10) for applying a tape (16) to a body (15) being moved past said apparatus, a cross slide (12) pivotally and linearly movable relative to said body (15), a housing (20) slidably mounted on said cross slide (12) toward and away from said body (15), an applicator roller (42) carried by said housing (20), a holder (50) movably mounted on said housing (20), a stitching roller (72) rotatably mounted on an extended end of said holder (50) in a predetermined position relative to said applicator roller (42), resilient means (66) urging said holder (50) and said stitching roller (72) outward from said housing (20) to position said stitching roller (72) outboard of said applicator roller (42), and brake means (94) activated by relative movement between said holder (50) and said housing (20) for arresting rotation of said applicator roller (42), said brake means (94) comprising: a cam roller (100) engaging along a portion of said holder (50), a cam recess (80) formed in said portion of said holder (50) into which said cam roller (100) can nest, means (108) for urging said cam roller (100) against said portion of said holder (50), and a braking block (118) on said brake means (94) engaging with said applicator roller (42) to stop rotation of said applicator roller (42) and means for moving said housing (20) and said applicator roller (42) away from said body (15) until said cam roller (100) nests in said cam recess (80) whereby said brake means (94) is pivoted to urge said braking block (118) against said applicator roller (42) to arrest rotation of said applicator roller (42).

11. In an apparatus (10) for severing a tape (16) being applied to a body (15) as said body (15) is moved past said apparatus (10), a housing (20), an applicator roller (42) carried by said housing (20) for applying tape (16) to said body (15), a holder (50) movably carried on said housing (20), a stitching roller (72) rotatably mounted on said holder (50) and projecting outward from said housing (20) to a predetermined position relative to said applicator roller (42), resilient means (66) urging said holder (50) and said stitching roller (72) outward from said housing (20) to position said stitching roller (72) outboard of said applicator roller (42), in combination: brake means (94) carried by said housing (20) for arresting rotation of said applicator roller (42), and means (80) on said holder (50) for activating said brake means (94) when said holder (50) and stitching roller (72) is extended a predetermined amount outboard of said applicator roller (42) whereby the tape (16) extending from said applicator roller (42) to said stitching roller (72) is severed as said body (15) is moved past said stitching roller (72), said brake means (94) comprising: a brake assembly (94) having a plate (96) pivotally mounted on said housing (20), an arm portion (104) extending in a direction opposite to said plate (96), and a tang (114) extending from said plate (96), at least one cam roller (100) rotatably supported on said plate (96), said cam roller (100) engaging with said holder (50) and being adapted to engage with said means (80) on said holder (50) as said housing (20) and holder (50) are moved relative to each other, resilient means (108) extending between said housing (20) and said arm portion (104) of the brake assembly (94) for urging said cam roller (100) toward said holder (50), and a braking block (118) supported on said tang (114) and contacting said applicator roller (42) when said cam roller (100) is seated in said means (80) on said holder (50) for stopping rotation of said applicator roller (42).

* * * * *